United States Patent [19]
Hagen

[11] Patent Number: 5,442,958
[45] Date of Patent: Aug. 22, 1995

[54] DEPLOYABLE PROBE COMBINED WITH FLUSH STATIC PORT

[75] Inventor: Floyd W. Hagen, Eden Prairie, Minn.

[73] Assignee: The B.F. Goodrich Company, Akron, Ohio

[21] Appl. No.: 990,733

[22] Filed: Dec. 15, 1992

[51] Int. Cl.⁶ .............................................. G01L 15/00
[52] U.S. Cl. .................. 73/170.02; 73/170.14; 73/861.66
[58] Field of Search ............. 73/866.5, 170.02, 170.01, 73/170.14, 861.65, 861.66, 861.68, 861.67

[56] References Cited

U.S. PATENT DOCUMENTS

| | | | |
|---|---|---|---|
| 3,581,565 | 6/1971 | Deiterich | 73/861.66 |
| 3,646,811 | 3/1972 | DeLeo et al. | 73/182 |
| 4,016,768 | 4/1977 | Mashburn et al. | 74/23 |
| 4,096,744 | 6/1978 | DeLeo et al. | 73/180 |
| 4,522,070 | 6/1985 | Hagen | 73/384 |
| 4,573,353 | 3/1986 | Daniel et al. | 73/198 |
| 4,615,213 | 10/1986 | Hagen | 73/180 |
| 4,981,038 | 1/1991 | Torres et al. | 73/182 |
| 5,337,602 | 8/1994 | Gibson | 73/861.68 X |

FOREIGN PATENT DOCUMENTS

| | | | |
|---|---|---|---|
| 963651 | 5/1957 | Germany. | |
| 2171526 | 8/1986 | United Kingdom | 73/861.66 |
| 2231667 | 11/1990 | United Kingdom. | |

*Primary Examiner*—Tom Noland
*Attorney, Agent, or Firm*—Westman, Champlin & Kelly

[57] ABSTRACT

A deployable probe has pressure ports positioned radially around a longitudinal probe axis. The probe mounts within a pressure chamber such that it can reciprocate from a retracted position where the pressure ports are contained within the pressure chamber for measuring static pressure to a deployed position where air flows generally orthogonal to the longitudinal axis of the probe and into the pressure ports such that differential pressures in oppositely facing pressure ports can be sensed for measuring relative flow magnitude and flow angles.

20 Claims, 4 Drawing Sheets

DEPLOYABLE PROBE COMBINED WITH FLUSH STATIC PORT

BACKGROUND OF THE INVENTION

The present invention relates to fluid pressure measuring systems for vehicles, and more particularly, to a deployable probe which extends to measure relative fluid speed and flow angles and retracts to measure local static pressure from a flush port.

Pressure sensing probes fixedly mounted to an air vehicle are well known for providing pressure measurements to determine altitude, airspeed (mach number), angle of attack, and angle of sideslip. Pressure sensing probes are usually mounted permanently on the exterior of an air vehicle. However, these probes increase the drag of the vehicle, are subject to physical damage when the vehicle is stored, and increase the susceptibility of the vehicle to radar or infrared detection.

Orthogonal airspeed sensors which measure local air velocity magnitude and direction over a 0 to 360 degree range are also known for use in various applications.

It is desirable to provide an air pressure measuring probe which can retract into a protective housing while an air vehicle is in flight to reduce drag and susceptibility to radar detection. Retraction of the probe also avoids physical damage to the probe while the vehicle is on the ground in transit or storage. It is also desirable to use the same probe to measure relative local static pressures, orthogonal airspeed, and flow angles.

SUMMARY OF THE INVENTION

The present invention relates to a sensing probe which can reciprocate from a retracted position completely within a chamber in the vehicle where it measures static pressure through a port, to a deployed position extending outwardly from the exterior surface of the vehicle, where it measures relative flow velocity magnitude and flow angles. In one embodiment the probe slides into and out of a cavity through a static port formed through the exterior surface of the vehicle. When extended, the probe extends perpendicular to the air flow to measure relative flow magnitude and flow angles.

DETAILED DESCRIPTION OF THE PREFERRED EMBODIMENTS

Figure 1:
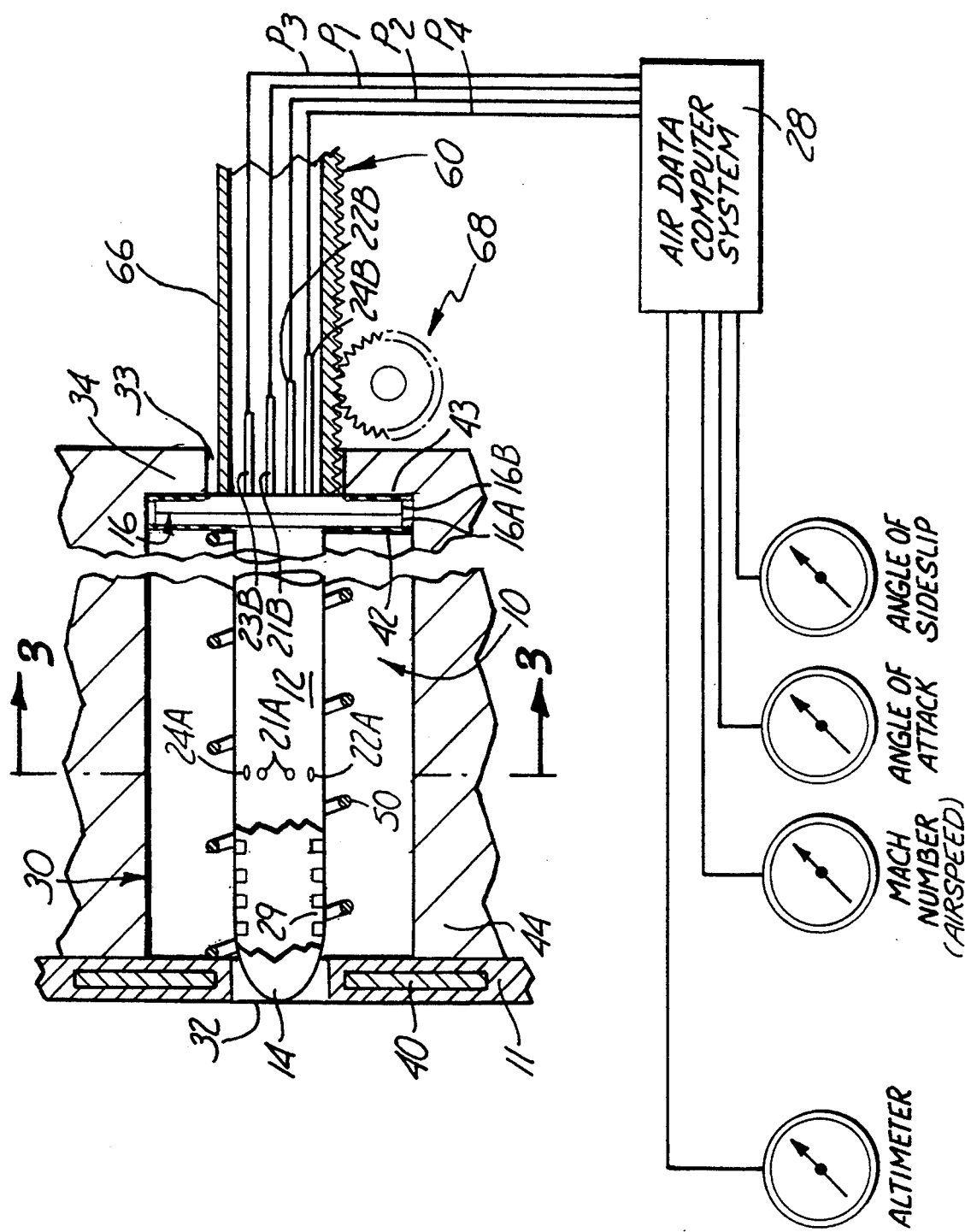
FIG. 1 is a sectional view of a deployable air probe employing the teachings of the present invention, with the probe in a retracted position.

A deployable probe, indicated generally at 10, senses local static pressure and/or orthogonal air speed and relative flow angle. The probe 10 measures pressure relative to a fluid medium, and it is particularly useful on aircraft where a stationary protruding probe has drawbacks. FIGS. 1-4 are made with reference to an air vehicles fuselage 11. In one embodiment, the probe 10 has an elongated barrel section 12 with a longitudinal axis oriented generally normal to the fuselage 11 of the air vehicle. The barrel 12 has a hemispherical outer end 14 opposite a base 16. The outer end 14 of probe 10 could also be flat and flush with the fuselage when retracted with only an annular slit open as an air pressure passageway. The probe base 16 includes sliding guide plates 16A and 16B which attach to each other by screw means 61, 62, 63, and 64 (see FIG. 3) for assembly purposes.

Figure 3:
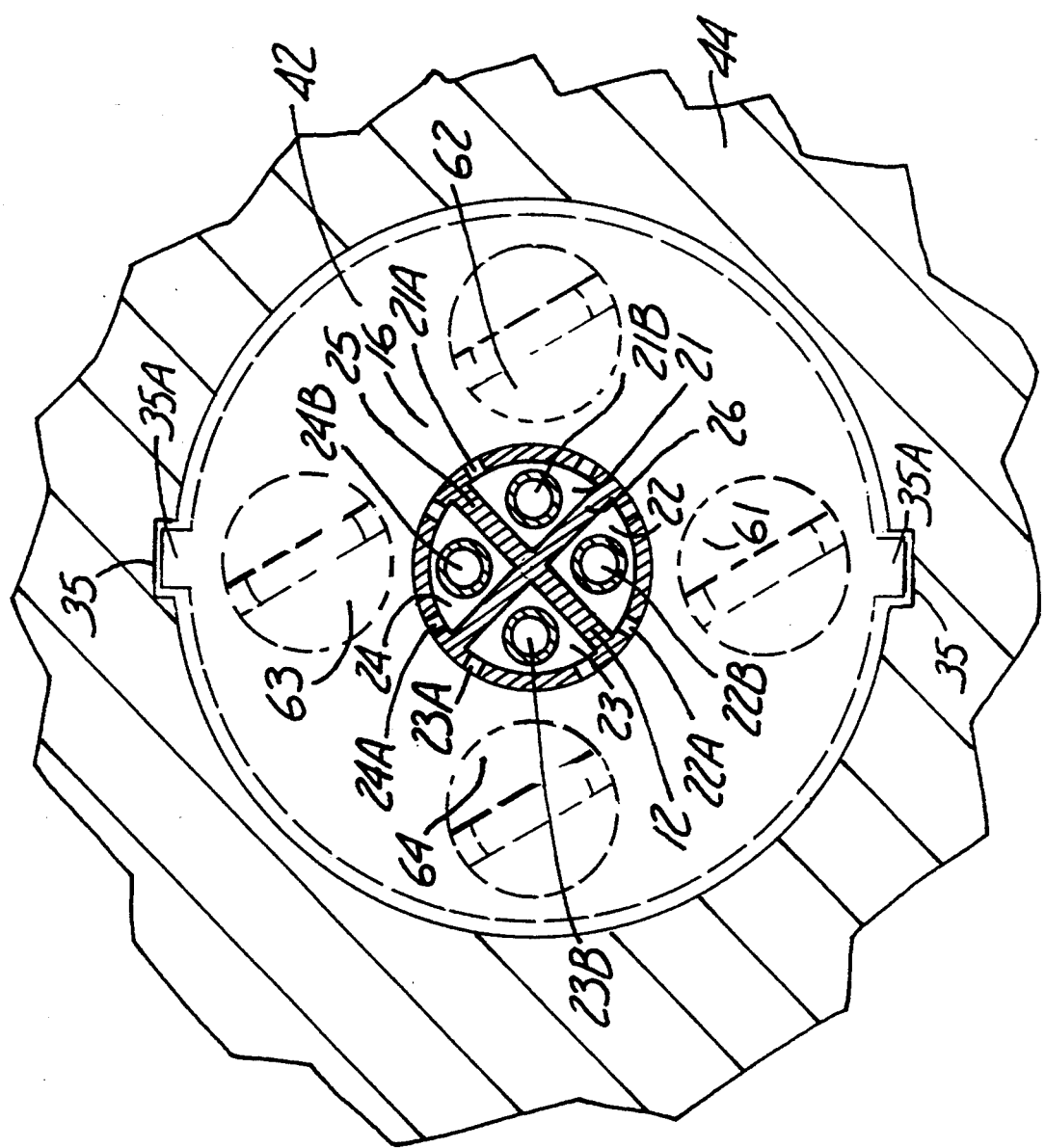
FIG. 3 is cross sectional view taken along line 3—3 in FIG. 1.

Referring to FIG. 3, internal longitudinally extending walls 25 and 26 of barrel 12 form four sealed chambers 21, 22, 23, and 24. Pressure sensing ports 21A, 22A, 23A, and 24A, open through the barrel 12 of the probe into each chamber 21 through 24 respectively. The ports 21A, 22A, 23A and 24A have axes extending radially from the central axis of the probe. Pressure tubes or conduits 21B, 22B, 23B, and 24B open from the respective chambers 21, 22, 23, and 24 for independently carrying pressures $P_1$, $P_2$, $P_3$, and $P_4$ in the respective chambers to remote instruments. The pressure tubes 21B through 24B flex, permitting the probe to reciprocate axially into and out of the fluid stream. The tubes can be coiled steel tubing or flexible material tubing. The teachings of U.S. Pat. No. 4,981,038 to Torres et al. entitled "Deployable Probe" sets forth examples of such flexible pressure tubes.

The pressure tubes 21B through 24B connect to pressure transducers (in air date computer systems 28, not shown) for converting the sensed pressure into proportional electrical signals. An air data computer system 28 utilizes the pressure signals to compute the differential pressure between opposed chambers 21, 23 and 22, 24. When the probe is deployed, the differential pressures $(P_1-P_3)$ and $(P_2-P_4)$ indicate relative flow angles and the air data computer system 28 also computes relative air flow magnitude (airspeed, static pressure, and flow angle) relative to a reference plane passing through the longitudinal axis of the probe as shown, for example in U.S. Pat. No. 3,646,811 to Hagen, entitled "Pressure Sensor For Determining Fluid Velocities". Thus, if the probe axis is horizontal and extending from an air vehicle, angle of attack is calculated. If the probe axis is vertical, angle of side slip is calculated. The specific equations used to calculate airspeed and flow angles with an orthogonal probe are well-known in the art and are set forth, for example, in U.S. Patent No. 3,646,811 to DeLeo and Hagen, entitled "Pressure Sensor For Determining Fluid Velocities" which incorporated herein by reference. See also U.S. Pat. No. 4,522,070 to Hagen, entitled "Method and Apparatus For Correcting Barometric Pressure For Wind Velocity and Direction."

Figure 2:
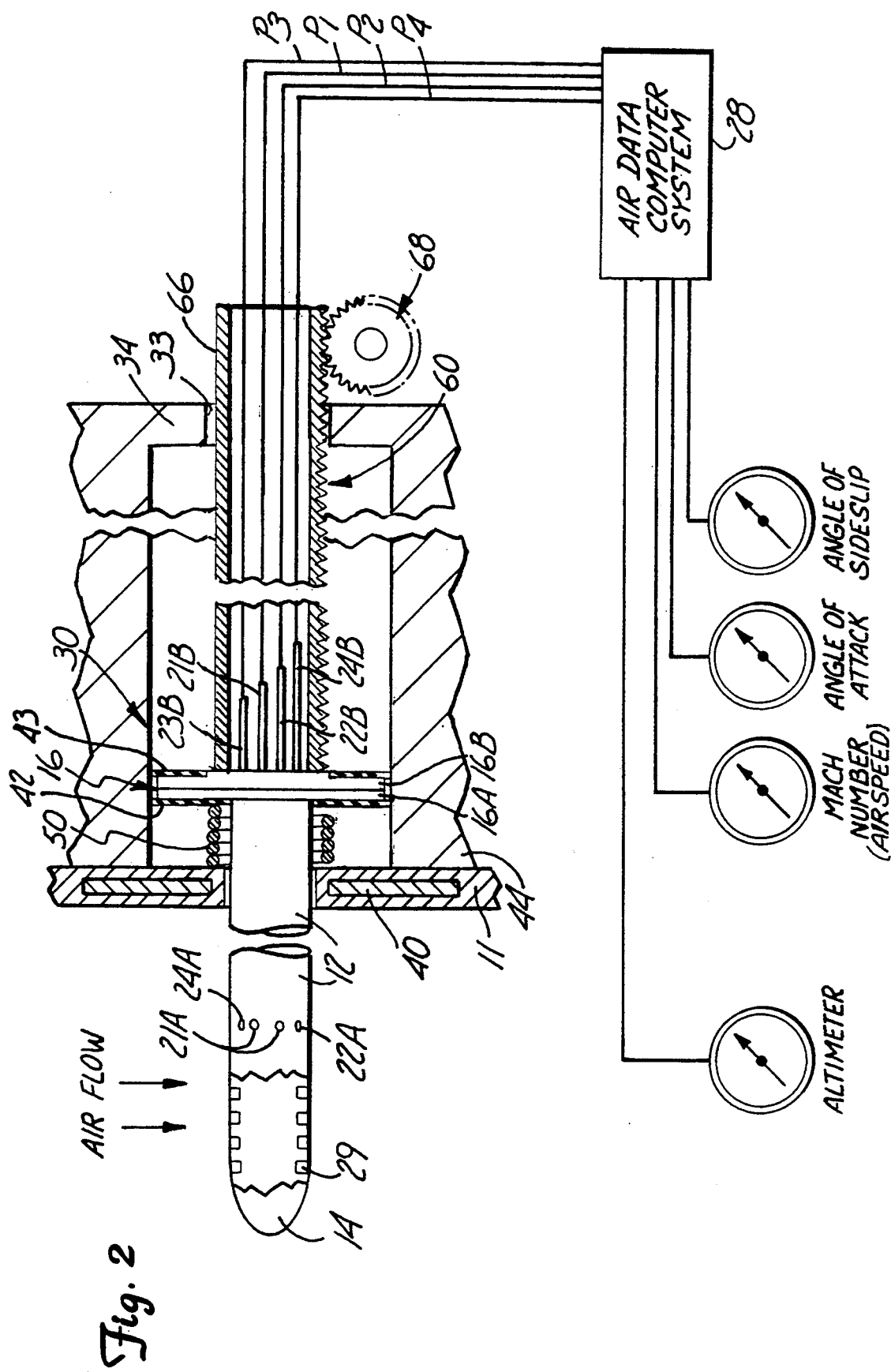
FIG. 2 is a sectional view of a deployable air probe employing the teachings of the present invention, with the probe in a deployed position.

Referring to FIGS. 1 and 2, a heating element 29 formed on the interior of the probe barrel 12 in desired locations provides deicing of the probe.

A cavity 30 is formed within a wall structure 44 of the fuselage 11 of an air vehicle or other housing for the probe 10. The cavity 30 opens through the fuselage, forming a static port 32 in the fuselage skin. The other end of the cavity 30 forms an outlet 33 for the pressure tubes 21B, 22B, 23B, and 24B. The static port 32 permits the barrel 12 to slide therethrough and the wall structure 44 around the static port 32 prevents the probe base 16 from passing therethrough. A retaining shoulder surface 34 at the outlet 33 of the cavity engages probe base 16 when the probe 10 is retracted within the cavity 30. The probe base 16 closes the outlet 33 to form a pressure chamber open only to pressure at the static port 32.

The static port 32 faces laterally to the air flow past the fuselage skin and the cavity 30 extends inwardly from the static port. The central axis of the static port 32 is perpendicular to the fuselage and coaxial with barrel 12. The wall structure 44 forming cavity 30 includes longitudinal grooves 35 or other alignment mechanism which operates with a corresponding key or dog 35A (See FIG. 3) on the probe base 16 to maintain rotational alignment of the probe 10 about its longitudinal axis and maintain the desired orientation of the pressure sensing ports relative to the airstream. The base 16 and cavity 30 also could be of non-circular cross-section to maintain orientation of the probe barrel 12 in use. Electrical heaters 40 placed in the skin of the fuselage 11 around the static port 32 prevent ice formation. The local static pressure outside the fuselage 11 and the local static pressure within the cavity 30 are the same. The cavity 30 is also referred to as a local static pressure chamber. When the axis of probe 10 extends laterally to the air flow and along a generally horizontal plane, the probe 10 senses angles of attack as stated. The flow angle $\theta$ can be measured over a full 0° to 360° angle range as the differential pressure between opposing chambers 21, 23 and 22, 24 either increases or decreases. When the axis of probe 10 extends along a vertical axis and laterally of the air flow, the probe 10 senses angle of sideslip in the same manner as it senses angle of attack.

A first gasket 42 provided on the exterior surface of probe base plate 16A establishes an air tight seal between the probe 10 and the wall structure 44 forming the cavity 30. A second gasket 43 provided on the exterior surface of probe base plate 16B establishes an air tight seal between the probe 10 and the retaining shoulder surface 34 of the cavity 30 to seal the outlet 33. The gaskets 42 and 43 flex enough to permit the probe to reciprocate within the cavity 30. Thus, when 10 the probe 10 retracts the gasket 43 seals the probe within the cavity 30 to form a local static pressure chamber. Although the gaskets 42 and 43 create an air tight seal, it should be apparent that any type of sealing arrangement between the probe 10 and the wall structure 44 forming cavity 30 can be used.

Figure 4:
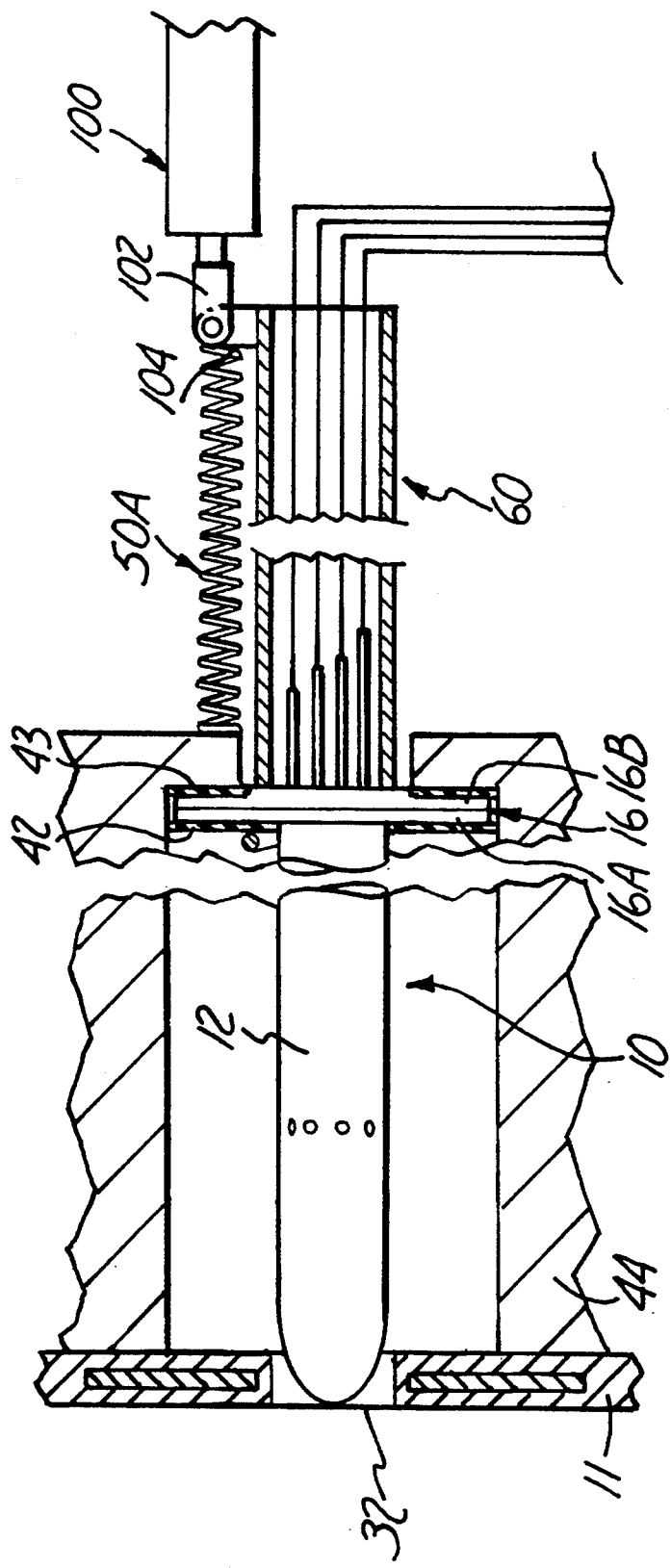
FIG. 4 is a sectional view of another embodiment of a deployable air probe employing the teachings of the present invention.

A compression spring 50, secured at one end to the fuselage 11 and at the other end to probe base plate 16A, urges the probe base 16 against the retaining shoulder surface 34 of the cavity 30 and thus biases the probe 10 to the retracted position. Upon failure of the deployment mechanism, the spring 50 retracts the probe as a fail safe condition. Alternatively, a tension spring, shown at 50A in FIG. 4 provides a biasing force to deploy the probe so that under failure of the deployment mechanism, the probe extends for fail-safe use. The spring 50A is secured at one end to the shoulder surface 34 at the other end to a tab 104 on a deployment tube 60. It should be apparent to those skilled in the art that both springs 50 and 50A can be either compression springs to retract the probe or tension springs to extend the probe.

Deployment tube 60 attaches to the plate 16A of the probe base 16 by anchoring screws 61, 62, 63, and 64 and extends the probe barrel 12 into the airstream such that the air flows past the probe barrel 12 perpendicular to the axis of the barrel. The gaskets 42 and 43 cover the anchoring screws 61, 62, 63, and 64 (See FIG. 3). As the deployment tube 60 reciprocates into and out of outlet 33, it reciprocates the probe barrel 12 into and out of the airstream through static port 32. A gear 66 or drive mechanism on the outer surface of the deployment tube 60 engages a clutched deployment mechanism 68 driven by a stepper motor (not shown). When the deployment mechanism 68 drives in a first direction, (or is engaged), it extends or deploys the probe barrel 12 into the airstream. When the deployment mechanism 68 drives in a reverse direction, it retracts the probe barrel 12 out of the airstream and into the cavity 30. When the deployment mechanism 68 is simply disengaged, the probe barrel 12 retracts under the force exerted by the spring 50 or when a tension spring 50A is used, the probe barrel 12 extends for use. Thus, the deployment mechanism 68 reciprocates the probe barrel 12 from a retracted position within the pressure chamber to a deployed position in the air flow either by itself or in combination with a biasing means such as springs 50 and 50A.

Other means of reciprocating the probe barrel 12 will be apparent to those skilled in the art. For example, referring to FIG. 4, electromagnetic devices, such as a solenoid 100, can replace the mechanical gears 66 and deployment mechanism 68. The solenoid 100 includes a drive pin 102 which engages the tab 104 protruding from the deployment tube 60. As mentioned above and as shown in FIG. 4, the solenoid reciprocates the probe barrel 12 through the static port 32 either by itself or in combination with biasing spring means such as tension spring 50A (See FIG. 4) or compression spring 50 (See FIG. 1).

In operation, the probe 10 functions at both low speed (0 to 100 knots) and high speeds (up to at least Mach 1.0). The probe is usually deployed for low speed landing and take off conditions and provides compensation signals, as a function of Mach Number and flow angle (both derived from pressures $P_1$, $P_2$, $P_3$, and $P_4$), to obtain true pressure altitude, calibrated airspeed, mach number and angle of attack over the entire flight envelope of any subsonic, transonic or supersonic air vehicle to assist in the take off and landing. Activating the deployment mechanism 68, including the stepper motor and deployment tube 60, deploys the probe. As the deployment tube 60 moves toward the static port 32, the probe barrel 12 extends into the airstream. Air flow acts on the pressure ports 21A, 22A, 23A, and 24A and independent different pressures $P_1$, $P_2$, $P_3$ and $P_4$ are present in the pressure tubes 21B, 22B, 23B, and 24B. Differential pressure signals between opposing passageways are used by the air data computer system 28 to produce the signals and readings mentioned above.

After takeoff, it is desirable to retract the probe 10 into the cavity 30 for low observability and infrared reduction and to reduce drag. The deployment mechanism 68 disengages the deployment tube 60. The spring 50 urges the probe 10 back into the cavity 30 until the probe base 16 engages the retaining surface 34. Air outside the fuselage flows across the static port 32 and static pressure exists in the cavity. Pressures $P_1$, $P_2$, $P_3$, and $P_4$ in the pressure tubes 21B, 22B, 23B, and 24B are substantially equal, and can be averaged to determine static pressure. Measurements are fed to the air data computer system 28 to provide aircraft altitude and for use in calculating outputs from separate sensors where static pressure is needed for obtaining accurate readings.

Thus, by selectively deploying a probe to measure airspeed and flow angle of a vehicle and by maintaining the probe barrel 12 in a static pressure chamber within the vehicle when it is undesirable to have the probe deployed, drag, radar observability and infrared detection are reduced while the ability to make air data computations is not.

Although the present invention has been described with reference to preferred embodiments, workers skilled in the art will recognize that changes can be made in form and detail without departing from the spirit and scope of the invention.

What is claimed is:

1. A deployable probe for measuring pressures of a fluid, and relative fluid flow magnitude and direction comprising:
    a wall structure forming a pressure chamber having a static port for communicating with the fluid;
    an elongated probe member having a longitudinal axis, said probe member having pressure ports therein for sensing pressure in at least two radial directions from said longitudinal axis spaced inwardly from an outer end thereof; and
    reciprocating means for reciprocating said probe member longitudinally between a retracted position where said pressure ports are contained within said pressure chamber and subject to pressure, and a deployed position where at least a portion of said probe member is extended through said static port and said pressure ports are subject to a fluid stream moving relative to said probe member generally orthogonal to said longitudinal axis of said probe member.

2. The deployable probe as in claim 1, wherein said probe member has a base operatively slidable within said pressure chamber and at least one sealing member which creates an air tight seal between said base and said wall structure.

3. The deployable probe as in claim 2, wherein said at least one sealing member seals said pressure chamber in both said retracted and said deployed positions.

4. The deployment probe as in claim 1, wherein said probe member has at least one pair of chambers, each open to pressure ports for sensing fluid flow direction and magnitude when said probe is in said deployed position.

5. The deployable probe as in claim 1, wherein said reciprocating means includes a deployment member attached to said base of said probe member extending through an outlet opening to said pressure chamber, said deployment member having a gear thereon operable with a motor to drive said gear and said deployment member.

6. The deployable probe as in claim 4, further comprising biasing means attached to said probe member for biasing said probe member to said retracted position.

7. The deployable probe as in claim 4, further comprising biasing means attached to said probe member for biasing said probe member to said deployed position.

8. The deployable probe as in claim 6, wherein said biasing means is positioned within said pressure chamber.

9. The deployable probe as in claim 7, wherein said biasing means is positioned exteriorly of the pressure chamber.

10. The deployable probe as in claim 1, wherein said reciprocating means includes retracting means for retracting said probe member from said deployed position to said retracted position, and a separate deploying means for deploying said probe member from said retracted position to said deployed position.

11. The deployable probe as in claim 10, wherein said retracting means comprises a spring connected to said probe member and urging said probe member to said retracted position.

12. The deployable probe as in claim 10, wherein said deploying means comprises a spring connected to said probe member and urging said probe to said deployed position.

13. The deployable probe as in claim 4, wherein said reciprocating means is an electromagnetic solenoid.

14. The deployable probe as in claim 13, further comprising biasing means attached to said probe member for biasing said probe member to said retracted position.

15. The deployable probe as in claim 13, further comprising biasing means attached to said probe member for biasing said probe member to said deployed position.

16. The deployable probe as in claim 4, further comprising flexible pressure tubes connected to said pressure ports for carrying pressure signals to remote instruments, said pressure tubes flexing as said probe member is reciprocated.

17. The deployable probe as in claim 3, further comprising first heater means for preventing ice formation around said probe member, said first heater means being positioned within said probe member.

18. The deployable probe as in claim 17, further comprising second heater means for preventing ice formation around said opening of said pressure chamber, said second heater means being positioned around said static port.

19. An air data sensor for use in an airstream mounted on an air vehicle having an exterior wall and having at least one cavity extending inward from the exterior wall and forming a pressure chamber, the cavity having a central axis extending laterally relative to a longitudinal axis of the air vehicle, the pressure chamber formed by the cavity being open at one end to the airstream, and a probe assembly for measuring local static pressure and relative air flow magnitude and angle in relation to the air vehicle, said probe assembly comprising:
    an elongated barrel having a barrel longitudinal axis mounted individually within the at least one cavity with the barrel longitudinal axis extending outwardly from the longitudinal axis of the air vehicle and said barrel having at least two pressure ports spaced inward from an outer end of said barrel for sensing pressure in at least two radial directions from said barrel longitudinal axes; and
    reciprocating drive connected to said barrel to move the barrel longitudinally and alternately back and forth along the barrel longitudinal axis between a first position wherein said at least two pressure ports are contained within the at least one cavity to sense pressure therein, and a second position where the airstream moves relative to said barrel generally orthogonal to said barrel longitudinal axis.

20. The air data sensor as in claim 19, wherein said barrel has a base slidable within said cavity, said base having a sealing means thereon for forming a substantially air tight seal between said barrel and a wall of the cavity.

* * * * *